P. ANDREW.
Rendering Apparatus.
No. 46,204.
Patented Feb. 7, 1865.
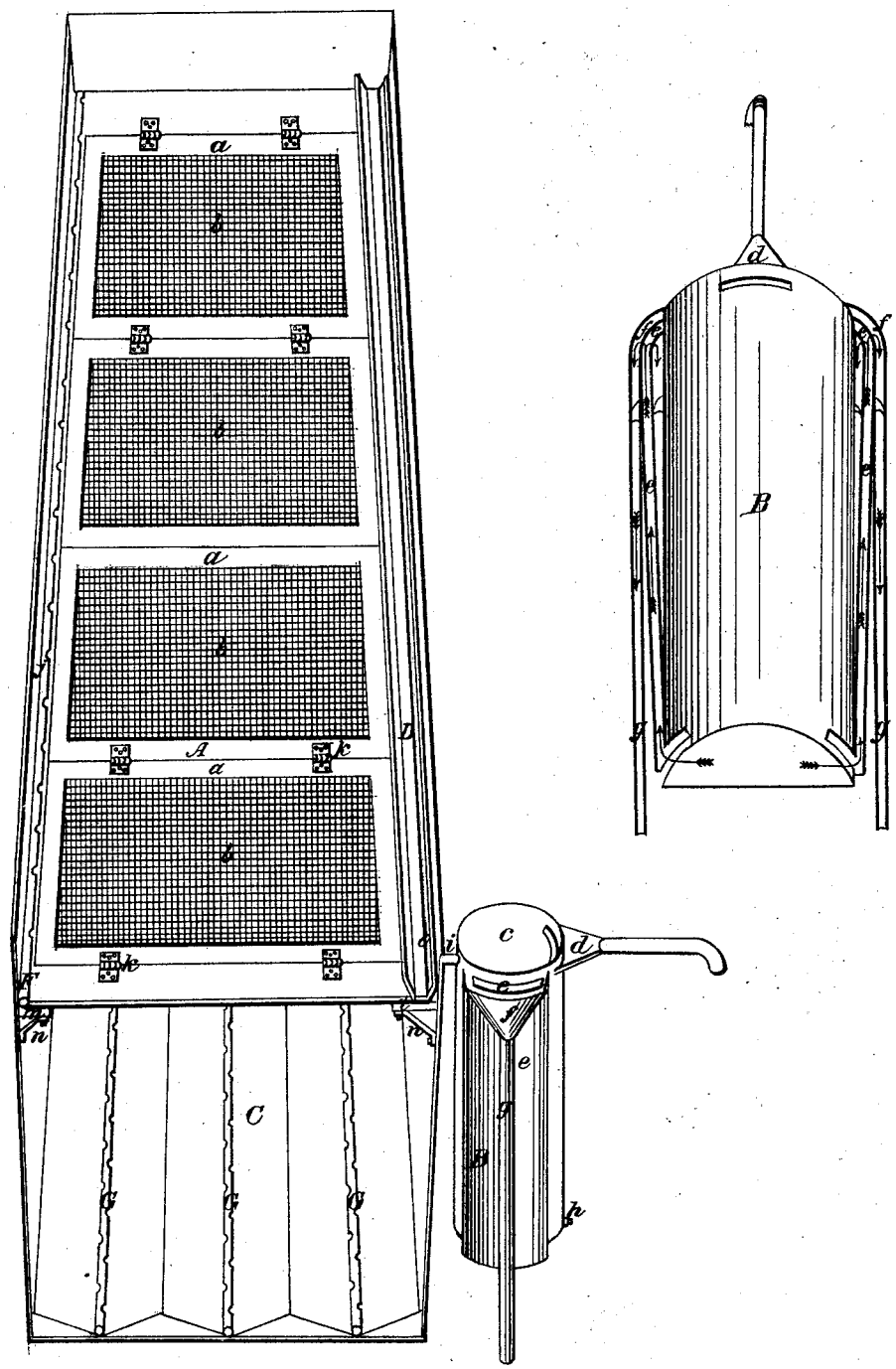

UNITED STATES PATENT OFFICE.

PETER ANDREW, OF CINCINNATI, OHIO.

IMPROVED MACHINE FOR SEPARATING LARD, TALLOW, AND GREASE FROM THE REFUSE OF RENDERING-TANKS.

Specification forming part of Letters Patent No. 46,204, dated February 7, 1865.

*To all whom it may concern:*

Be it known that I, PETER ANDREW, of the city of Cincinnati, in the county of Hamilton and State of Ohio, have invented certain new and useful apparatus for the purpose of separating the lard, tallow, or grease from the refuse or slush of steam-rendering tanks; and I hereby declare that the following is a full and sufficient description, reference being had to the annexed drawings, making part of the specification, and letters of reference marked thereon.

In the drawings which illustrate my improvements, Figure 1 is a perspective view of the inside of the slush-vat, the end of the vat having been removed to exhibit its internal arrangement, showing the water-pipe F and the frames and screens A, trough D, steam-pipes G, and bottom of the vat C, also the trap B attached; Fig. 2, a perspective view of one-half of the trap, showing its internal arrangement.

A are screens for separating the grease from the light matter that rises with it; B, trap for separating the water from the grease; C, bottom of slush-vat; D, trough into which the grease and water flow from the surface of the water in the vat; F, water-pipe having small perforations at intervals throughout its length; G, perforated steam-pipes; $a$, frames upon which the wire screens $b$ are fastened; $b$, fine woven-wire-cloth screens, which cover the openings in frames $a$; $c$, the body of the grease-trap; $d$, discharge pipe for the grease, which conducts it to a receptacle; $e$, passage of the water from the bottom of the trap; $f$, basins that receive the water that flows from passages $e$; $g$, pipe that conducts the water from basin $f$; $h$, plug at the bottom of the trap, for drawing off the water when the trap is not in use, and for the purpose of cleaning it; $i$, pipe that conducts the grease and water from trough D into trap B; $j$, perforations in water and steam pipes; $k$, hinges connecting the screens with each other and with the ends of the vat; $l$, rail for the support of the screens when covering the vat, and upon which the trough D rests. It is fastened to the front of the vat. $m$ is a rail fastened to the back of the vat for the support of the screens; $n$, iron braces supporting the rails $l$ and $m$.

The inventions are, first, trap B, for separating the water from the grease, and may be used for the separation of any liquids of unequal specific gravities; second, the folding screens A, for separating the grease from the light refuse which rises with it, and may be used for separating any fluid having no affinity for water and of less specific gravity from any light substance not liquid; third, the trough D, for skimming the grease from the surface of the water in the vat; fourth, the form of the bottom C, which admits the steam as it issues from the perforations in the pipes to operate on all that rests on the bottom; fifth, the perforated water-pipe F, for admitting water into the vat, lifting the grease above the screens until it flows into gutter D and driving it into the gutter.

The body of the trap is a cylinder, but may be made in any other form that is convenient or desirable. It should be two feet or more in height, having a diameter proportionate to the work it has to perform, standing in a vertical position, the bottom or lower end being closed, and has at the bottom an opening on each side into pipes $e$ for the escape of the water into these pipes or passages, which are fastened to the cylinder on the outside at the bottom and extend upward to within one-quarter or three-eighths of an inch of the bottom of the slot which is the mouth of pipe $d$, causing the water in the cylinder always to stand at that point. The water rises in and flows over the top of these passages into the basins $f$, which surround them, and is conducted off through pipes $g$, which are attached to the lower part of the basins. It is important to have the rims of passages $e$ so extended that the flow from them shall be sufficient to prevent the water, when there is a heavy flow, rising in the cylinder to a height that would cause it to run into the mouth of the discharge-pipe $d$.

The screens A are square frames having a fine wire-cloth screen fastened on the upper side, entirely covering the openings in the frames. For convenience they are hinged together each way from the center of the vat, and are attached to the vat with hinges within a few inches of the ends of the vat. When it is necessary to uncover the vat for the purpose of filling, discharging, or cleaning it, the screens are folded one upon the other, each way from the center, and rest against the ends of the vat. They are placed sufficiently high in the vat that the slush will not quite reach them when it is discharged from the tank, and rest, when covering the contents of the vat, upon rails $l$ and $m$. These rails are supported by braces. (Not marked in the drawings.)

Gutter or trough D is made flaring and extends from end to end of the vat, the upper edge being exactly level, that the grease and water may flow into it throughout its entire length. It is fastened to the front of the vat on the inside. The bottom of it rests upon plank $n$, which is also one of the supports of the screens.

The bottom of the vat C is formed into two or more V-shaped gutters, which extend from one end of the vat to the other. The number of gutters required depends upon the width of the vat. Steam-pipes, perforated on opposite sides, extend the length of the gutters and are placed in the center or lowest part of them. Steam issues from the small holes in the pipe, striking the inclined sides of the gutters, operates upon the slush that rests upon the bottom, heating and agitating the whole contents of the vat, freeing and causing the grease to rise to the surface.

Water-pipe F extends from end to end of the vat, having perforations at intervals throughout its length on the side toward the gutter D, and is fastened to the back of the vat at such a height that the center of the pipe is level with the upper edge of gutter D. This pipe is so arranged that the holes in the pipe may be turned down when the water is first let in, and is kept in this position until the water has risen sufficiently high in the vat to flow into gutter D. They are then turned up to the surface of the water, the streams issuing from them drive the grease from the surface of the water into the gutter. This pipe has a connection with the conveying-pipe; but it is so simple in its arrangement and so generally known that it was not considered necessary to represent this in the drawings, nor the arrangements of pipes to turn up or down. The agregate areas of the whole of the perforations in the pipe should not exceed the area of the pipe unless there is a greater pressure of water in the pipe.

The following is a description of the operation of the apparatus described in the foregoing: After the slush from the tank is dropped into the vat, the steam is let into pipes G. Issuing through the perforations, it heats and agitates the contents of the vat, thus freeing the grease from the refuse and causing it to rise with the light matter to the surface. When all the grease has risen, the screens are unfolded, covering the contents of the vat. The water-pipe is then turned, that the water issuing from the small holes in the pipe will be directed downward. The water is then let into the pipe. When the water has risen in the vat, lifting the grease above the screen until it begins to flow into gutter D, the pipe is turned, throwing the steams across the surface of the water, causing the grease to flow into trough D, from whence it is carried into trap B through pipe $i$. When it enters the trap, it flows over the surface of the water into the mouth of pipe $d$, which conducts it to a receptacle. The water as it enters the trap sinks to the bottom and ascends through passages $e$, overflows these passages into basins $f$, and from them through pipes $g$ to a gutter that leads it from the house.

Having described the nature of my inventions, their use, and mode of construction, I will proceed to state the claims:

1. The trap B, arranged as specified and shown, operating substantially in the manner described, for separating the grease from the water, and for the separation of liquids of unequal specific gravity.

2. The use of wire screens, substantially as described and set forth, for the separation of lard, tallow, or grease from the refuse or slush taken from steam rendering-tanks, and for the separation of any liquid having no affinity for water and of less specific gravity from any substance that is not liquid.

3. The trough or gutter D, for the purpose of skimming the grease from the surface of the water in the vat, as specified, and in the manner described.

4. The perforated water-pipe F, for the purpose of lifting the grease above the screens until it flows into trough D, and for continuing the flow and driving it into the trough, as described and shown.

5. The bottom of the vat, formed and arranged as described, and for the purpose set forth.

P. ANDREW.

Witnesses:
W. F. KELLY,
CHAS. C. HARDIN.